United States Patent
Odom et al.

(10) Patent No.: US 9,434,624 B2
(45) Date of Patent: Sep. 6, 2016

(54) COMPOSITIONS AND METHODS FOR THE REMOVAL OF PHOSPHATES AND OTHER CONTAMINANTS FROM AQUEOUS SOLUTIONS

(71) Applicant: NClear IP LLC, Miramar Beach, FL (US)

(72) Inventors: Steven A. Odom, Miramar Beach, FL (US); Denny J. Ivey, Carrollton, GA (US)

(73) Assignee: NCear Inc., Mirimar Beach, FL (US)

( * ) Notice: Subject to any disclaimer, the term of this patent is extended or adjusted under 35 U.S.C. 154(b) by 0 days.

(21) Appl. No.: 14/630,876

(22) Filed: Feb. 25, 2015

(65) Prior Publication Data

US 2015/0183662 A1    Jul. 2, 2015

Related U.S. Application Data

(63) Continuation of application No. PCT/US2013/057199, filed on Aug. 29, 2013.

(60) Provisional application No. 61/695,201, filed on Aug. 30, 2012, provisional application No. 61/715,812, filed on Oct. 18, 2012, provisional application No. 61/780,267, filed on Mar. 13, 2013.

(51) Int. Cl.
| | |
|---|---|
| C01B 33/24 | (2006.01) |
| C02F 1/28 | (2006.01) |
| B01J 20/10 | (2006.01) |
| B01J 20/30 | (2006.01) |
| C02F 101/10 | (2006.01) |
| C02F 101/16 | (2006.01) |
| C02F 101/20 | (2006.01) |
| C02F 103/00 | (2006.01) |
| C02F 103/20 | (2006.01) |
| C02F 103/22 | (2006.01) |
| C02F 103/32 | (2006.01) |

(52) U.S. Cl.
CPC ............... *C02F 1/281* (2013.01); *B01J 20/10* (2013.01); *B01J 20/3078* (2013.01); *C02F 1/288* (2013.01); *C02F 2101/105* (2013.01); *C02F 2101/163* (2013.01); *C02F 2101/20* (2013.01); *C02F 2103/001* (2013.01); *C02F 2103/20* (2013.01); *C02F 2103/22* (2013.01); *C02F 2103/32* (2013.01)

(58) Field of Classification Search
CPC ...... C02F 1/62; C02F 1/5236; C02F 1/5245; B01J 39/14; C01B 33/126
USPC ........... 252/175; 210/688; 106/470; 423/331
See application file for complete search history.

(56) References Cited

U.S. PATENT DOCUMENTS

| | | |
|---|---|---|
| 5,395,533 A | 3/1995 | Su et al. |
| 7,884,043 B2 | 2/2011 | Lisetskiy et al. |
| 8,147,702 B2 | 4/2012 | Al-Jlil |

(Continued)

OTHER PUBLICATIONS

International Search Report & Written Opinion dated Jan. 10, 2014, from corresponding International Application No. PCT/US2013/057199 along with Corrected Written Opinion dated Jan. 22, 2014.

*Primary Examiner* — Khanh Tuan Nguyen
(74) *Attorney, Agent, or Firm* — Louis Isaf; Russell Timm (57) ABSTRACT

Compositions and methods for removing phosphates, nitrates and heavy metals from aqueous solutions.

3 Claims, 7 Drawing Sheets

COMPOSITIONS AND METHODS FOR THE REMOVAL OF PHOSPHATES AND OTHER CONTAMINANTS FROM AQUEOUS SOLUTIONS

CROSS-REFERENCE TO RELATED APPLICATIONS

This application is a continuation of International Application No. PCT/US2013/057199, filed Aug. 29, 2013; which application claims priority to U.S. Provisional Applications Nos. 61/780,267, filed 13 Mar. 2013, 61/715,812, filed 18 Oct. 2012, and 61/695,201, filed 30 Aug. 2012, each of which is herein incorporated by reference in its entirety.

TECHNICAL FIELD OF THE INVENTION

The invention relates generally to compositions and methods for removing phosphates, nitrates and heavy metals from aqueous solutions using one or more crystalline compositions comprised of multiple calcium silicate crystalline structures and amorphous structures

BACKGROUND OF THE INVENTION

The increasing accumulation of phosphorus, nitrogen and heavy metals discharged into the environment from agricultural, storm water run-off, wastewater treatment discharge and other sources is one of the most significant environmental challenges facing the planet. Phosphorus is also used in fertilizers, and given that phosphate mines are depleting and may be fully depleted within next 100 years, world food supplies will certainly be impacted.

Elevated phosphorus levels in surface waters leads to eutrophication, which is detrimental to aquatic life. To control eutrophication, the EPA recommends that total phosphates should not exceed 0.05 mg/L (as phosphorus) in a stream at a point where it enters a lake or reservoir, and total phosphorus should not exceed 0.1 mg/L in streams that do not discharge directly into lakes or reservoirs. To date, phosphorus removal has been accomplished with flocculation/precipitation methods that use metal salts such as ferric chloride, aluminum sulfate (alum) and calcium hydroxide (lime). In many cases, these methods require the use of polymers to enhance the precipitation and ultimate solids removal. Various methods have been detailed that utilize naturally occurring and synthesized forms of xonotlite and/or tobermorite to remove phosphorus. These materials are restricted by pH of the solution, as increasing pH causes bicarbonate ions to convert to carbonate ions, reducing the efficiency of removal. Another method of phosphorus removal is the chemical formation of struvite (ammonium magnesium phosphate hexahydrate). This process requires the introduction of a magnesium source, typically magnesium hydroxide, and is dependent on a high ammonia level as the ammonium source.

Nitrates are also of concern as increased levels in surface water and groundwater lead to undesirable levels in drinking water supplies. The current drinking water nitrate limit is 10 mg/L as nitrogen. Nitrate removal has most often been accomplished via microbiological denitrification. This process requires the availability of denitrifying bacteria in a reduced oxygen environment. The bacteria metabolize the nitrate resulting in reduction to nitrite and ultimately nitrogen gas.

Discharges of metal ions into water sources can render water non-potable as well as having adverse affects on aquatic life. In-stream water quality standards as well as National Drinking Water Standards for metals are very low. Metal ions have most often been removed from water and wastewater by flocculation/precipitation as metal hydroxides. This is typically accomplished by the addition of an alkali such as calcium hydroxide or sodium hydroxide. Typically a polymer is required to enhance flocculation and aid in solids removal. Metal ion removal is also accomplished by the use of cation exchange resins. This process typically requires a relatively clean water source that is free of suspended solids and oils and greases.

Accordingly, there is a need for compositions and methods for making the same that are highly efficient at removing phosphate, nitrate, and metal ions from aqueous solutions such as water and wastewater. It is especially preferable that the foregoing compositions are able to provide sufficient alkalinity necessary for effective phosphate removal without requiring additional pH adjustment. It is even more preferable that the foregoing compositions can be manipulated in ways to adsorb various cations and anions given that the aqueous solutions contemplated in connection with the present invention have differing contaminant profiles.

It is also highly preferred that the foregoing compositions are safe for use in removing contaminants from potable water sources and in food processing applications. It is also preferred that the foregoing compositions can recover phosphate and nitrate in a form that can be used as a fertilizer.

BRIEF SUMMARY OF THE INVENTION

The present invention relates to compositions and methods for removing phosphates, nitrates, and heavy metals from aqueous solutions using one or more compositions comprised of multiple calcium silicate crystalline structures and amorphous structures. Compositions in accordance with the present invention remove phosphates and nitrates from surface waters, and in some cases can yield a high quality, slow-release fertilizer (5-35-0).

It is an object of the present invention to provide compositions and methods for highly efficient removal of phosphate, nitrate, and metal ions from aqueous solutions such as water and wastewater. It is also an object of the present invention to provide compositions that are able to provide sufficient alkalinity necessary for effective phosphate removal without requiring additional pH adjustment. It is also an object of the present invention to provide compositions that can be manipulated in ways to adsorb various cations and anions. It is also an object of the present invention to provide compositions that are safe for use in removing contaminants from potable water sources and in food processing applications. It is also an object of the present invention to provide compositions that can recover phosphate and nitrate in a form that can be used as a fertilizer.

Aqueous solutions contemplated for applications of the invention include agricultural run-off, retention ponds, animal farm run-off, animal park run-off, streams, lakes, canals, reservoirs, residential and commercial storm-water run-off, wastewater treatment plant discharge, food processing discharge, industrial wastewater discharge, residential wastewater discharge, meat processing residuals, toilet water, and aquarium water.

Compositions in accordance with the present invention may be utilized in a variety of applications. In one embodiment, a composition is contacted with an aqueous solution containing phosphates, nitrates, heavy metals and/or other contaminants in a reaction chamber that is designed to speed the rate of contact using centrifugal force. In a related embodiment, the reactor uses a Taylor vortex system operated under laminar flow conditions.

In another embodiment a composition is contacted with an aqueous solution containing phosphates, nitrates, heavy metals and/or other contaminants by way of a dry feed or slurry mix into the final DAF or process stream (e.g., wastewater final treatment (municipal or food processors)). In another embodiment, a composition is contacted with an aqueous solution containing phosphates, nitrates, heavy metals and/or other contaminants by way of an AdEdge™ Filtration System (e.g., high concentration nutrient removal).

In another embodiment, a composition is contacted with an aqueous solution containing phosphates, nitrates, heavy metals and/or other contaminants by way of a portion injector (e.g., for use with a urinal or toilet).

In another embodiment, a composition is contacted with an aqueous solution containing phosphates, nitrates, heavy metals and/or other contaminants by way of dry or slurry broadcast or crop dusting (e.g., on the ground or on a surface water body).

In another embodiment, a composition is contacted with an aqueous solution containing phosphates, nitrates, heavy metals and/or other contaminants by way of a buried barrier (e.g., a sheet comprising the composition buried below the surface of an animal farm or park or used to capture aquarium filtrate for removing phosphates).

DETAILED DESCRIPTION OF THE INVENTION

The present invention relates to methods of producing a composition capable of removing phosphates, nitrates and heavy metals from a solution comprising: (a) forming a slurry comprising calcium oxide, silicon dioxide, an alkali, and a solvent; and (b) producing the composition capable of removing phosphates, nitrates and heavy metals from a solution by subjecting the slurry to a hydrothermal process under sufficient pressure and for sufficient time to form the composition. The foregoing composition may be interchangeably referred to as a "hydrothermal residue". In some embodiments, the methods comprise an additional step (c) of heating the composition/hydrothermal residue at a temperature and for a time sufficient to increase the efficiency/effectiveness of the resultant composition at removing phosphates, nitrates and/or heavy metals from a solution.

In certain embodiments, the alkali is selected from the group consisting of ammonium hydroxide, calcium hydroxide, magnesium hydroxide, potassium hydroxide and sodium hydroxide. In some embodiments, the alkali may be in the form of a liquid alkali that comprises an alkali solute and the solvent. In some embodiments, the solvent is water or comprises water. In other embodiments the solvent is a liquid into which the calcium oxide, silicon dioxide and alkali are at least partially miscible, e.g., other polar protic solvents such as acetic acid, t-butanol, ethanol, formic acid, isopropanol, methanol and nitromethane. Mixtures of polar protic solvents are also acceptable.

In some embodiments, the molar ratios of the calcium oxide, silicon dioxide and liquid alkali is 2.7:2.5:1 respectively. In related embodiments, the foregoing molar ratios may be varied independently by ±1%, ±2%, ±3%, ±4%, ±5%, ±6%, ±7%, ±8%, ±9% or ±10%. For example, the molar ratio of the calcium oxide:the silicon dioxide:the alkali in the slurry in one embodiment ranges from 2.43-2.97:1.12-1.38:0.9-1.1.

In particular embodiments, the slurry may additionally comprise a higher molar ratio of calcium oxide in order to achieve higher alkalinity. In some embodiments, the molar ratio of calcium oxide, silicon dioxide, and alkali is 2.7:1.25:1. In related embodiments the foregoing molar ratio may be varied independently by as much as by ±1%, ±2%, ±3%, ±4%, ±5%, ±6%, ±7%, ±8%, ±9% or ±10%.

The present invention also relates to methods of producing a composition capable of removing phosphates, nitrates and heavy metals from a solution comprising (a) forming a slurry comprising calcium oxide, silicon dioxide, an alkali, a solvent and a metal halide salt; and (b) subjecting the slurry to a hydrothermal process under sufficient pressure and for sufficient time to form the composition. The foregoing composition may be interchangeably referred to as a "hydrothermal residue". In some embodiments, the methods comprise an additional step (c) of heating the composition/hydrothermal residue at a temperature and for a time sufficient to increase the efficiency/effectiveness of the resultant composition at removing phosphates, nitrates and/or heavy metals from a solution.

In related embodiments, the metal halide salt is selected from the group consisting of aluminum chloride, ferric chloride, lanthanum chloride, and magnesium chloride. In some embodiments, the molar ratio of the calcium oxide:the silicon dioxide:the alkali:metal halide salt is 54:25:20:5.5. In related embodiments, the foregoing molar ratios may be varied independently by ±1%, ±2%, ±3%, ±4%, ±5%, ±6%, ±7%, ±8%, ±9% or ±10%. For example, the molar ratio of the calcium oxide:the silicon dioxide:the alkali:the metal halide salt in one embodiment ranges from 48.6-59.4:22.5-27.5:18-22:4.95-6.05.

In some embodiments, the slurry may additionally comprise one or more amorphous compounds. In other embodiments, the calcium ion concentration and/or pH of the slurry may be increased by adding or more calcium salts and/or soluble alkaline earth salts.

In some embodiments, the hydrothermal process is carried out under at least about 13.5, 14, 14.5, 15, 15.5, 16 or 16.5 psi of pressure. In related embodiments, the slurry is subjected to the hydrothermal process for at least 1, 2, 3, 4, 5 or as many as 6 hours. The hydrothermal process may involve, for example, a sealed or covered reaction vessel heated at 121° C. (±10%) such that the equivalent of the temperature generated by the foregoing range of steam pressures is achieved. In these embodiments, the reaction vessel may consist of a heated "jacketed" ball mill and or a sealed pressure pot or covered reaction vessel.

In embodiments involving an additional "activation" step (i.e., step (c)), the composition/hydrothermal residue is heated for at least 27 minutes as low as 540° C. to as high as 660° C. In related embodiments, the composition/hydrothermal residue is heated for at least 28, 29, 30, 31, 32 or 33 minutes up to 12 hours. The activation step may be accomplished by using, for example, a muffle furnace, electric kiln, or a gas kiln.

The present invention also relates to compositions produced by the foregoing methods. Compositions in accordance with the present invention may also be characterized by methods of chemical analyses known in the art, for example, scanning electron microscopy (SEM) used in conjunction with energy dispersive spectrometry (EDS) or x-ray crystallography/diffraction (XRD). In one embodiment, a composition in accordance with the present invention has the EDS spectrum shown in FIG. 8. In another embodiment, a composition in accordance with the present invention has the XRD spectrum shown in FIG. 9.

Figure 9:
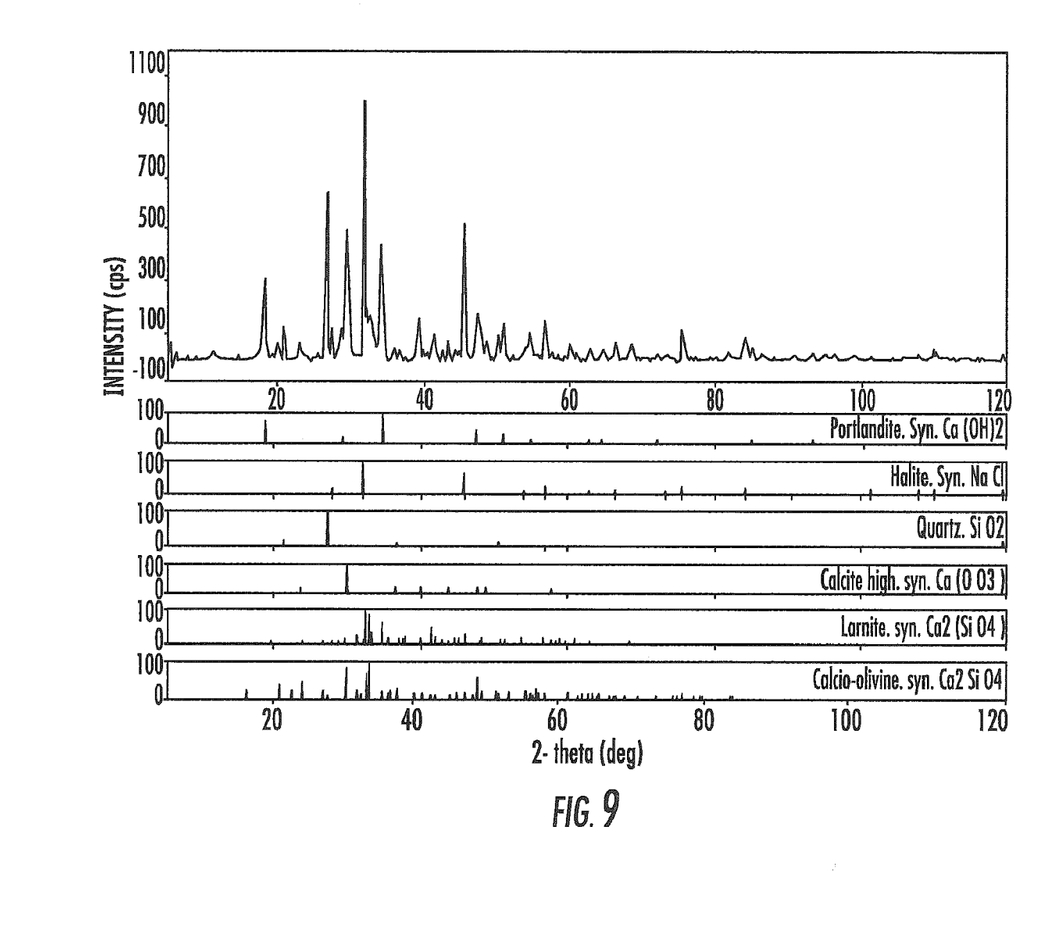
FIG. 9 shows the XRD spectrum of Composition B.

The composition as shown in FIG. 9 comprises two different crystalline structures of calcium silicate ($Ca_2SiO_4$). XRD spectrum data for Composition B also indicated that in addition to the two separate $Ca_2SiO_4$ structures, the following crystal structures were also present: $Ca(OH)_2$, NaCl, $SiO_2$ and $CaCO_3$. The XRD spectrum data was obtained using Cu—Kα radiation.

Figure 10:
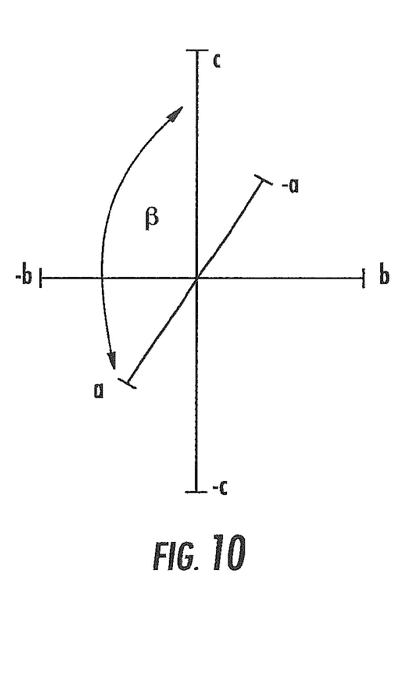
FIG. 10 shows how the spatial orientation of the atoms within the calcium silicate molecules may be altered resulting in changes in bond lengths and or bond angles.

Specific crystalline structure may be altered through composition variation and/or temperature and/or pressure variations. Spatial orientation of the atoms within the calcium silicate molecules may be altered resulting in changes in bond lengths and or bond angles as shown in FIG. 10.

After being removed from a heat source, the resultant crystalline composition may be applied to a variety of aqueous solutions. For example, in one embodiment the crystalline composition may be contacted with an aqueous solution in a Taylor vortex system operated under laminar flow conditions when levels of nitrates, heavy metals and/or other contaminants are very low. In a system arranged in this manner, the reactor fluid dynamics are such that the unique vortex effect causes several layers of donut shaped levels of water spinning vertically through the donut hole and horizontally along the circumference of the reactor. Centrifugal force causes the crystalline composition and any other solutes to concentrate along the inner face of the reactor, increasing contact exposure and significantly reducing reaction time and improving adsorption efficiency.

In another embodiment, the crystalline composition can be applied to contaminated surface water. Water is pumped from a contaminated pond, lake or canal into a smaller tank or other receptacle. Algae and debris are removed or returned back to the source. The crystalline composition is then injected into the effluent flowing in a pipe and mixed using a mixing means, causing phosphates, nitrates, and heavy metals to be adsorbed onto the crystalline composition, which then are filtered by way of, e.g., a collection screen. Cleaned water is then discharged back into the source or into another body of water.

In another embodiment, the crystalline composition can be spread over lakes and ponds, for example by way of a barge, to adsorb and bind to nutrients to lower nutrient levels. The crystalline composition can also be mixed in soils to adsorb nutrients which will significantly reduce rainwater runoff problems. The crystalline composition may also be buried in a layer below the surface as a barrier which will prevent nutrients from entering ground water and aquifers. Multiple (i.e., staged) applications may be necessary to ensure that the pH is maintained to avoid harming marine and aquatic life.

In another embodiment, the crystalline composition may be used to treat wastewater by adding the composition directly into a mixed liquor or final DAF. After adsorption, the crystalline composition is flocculated out, processed and disposed of or sold as an edible by-product In another embodiment, the crystalline composition may be used in an aquarium.

In another embodiment, the crystalline compositions may be dispensed into a toilet coincident with flushing.

In another embodiment, the crystalline composition may be used as an inorganic polymer flocculant. In still other embodiments, the crystalline composition comprises another inorganic or organic polymer.

EXAMPLES

The invention is now described with reference to the following Examples. These Examples are provided for the purpose of illustration only, and the invention is not limited to these Examples, but rather encompasses all variations which are evident as a result of the teachings provided herein.

Example 1

100 mL of a 1 M solution of sodium hydroxide was added to a mixture comprising 15 g of calcium oxide and 15 g of silicon dioxide at room temperature. The resultant slurry was hydrothermally reacted in an autoclave for six hours under 15 psi of steam pressure. The remaining solids were heated in a muffle furnace at 600° C. for thirty minutes.

Figure 1:
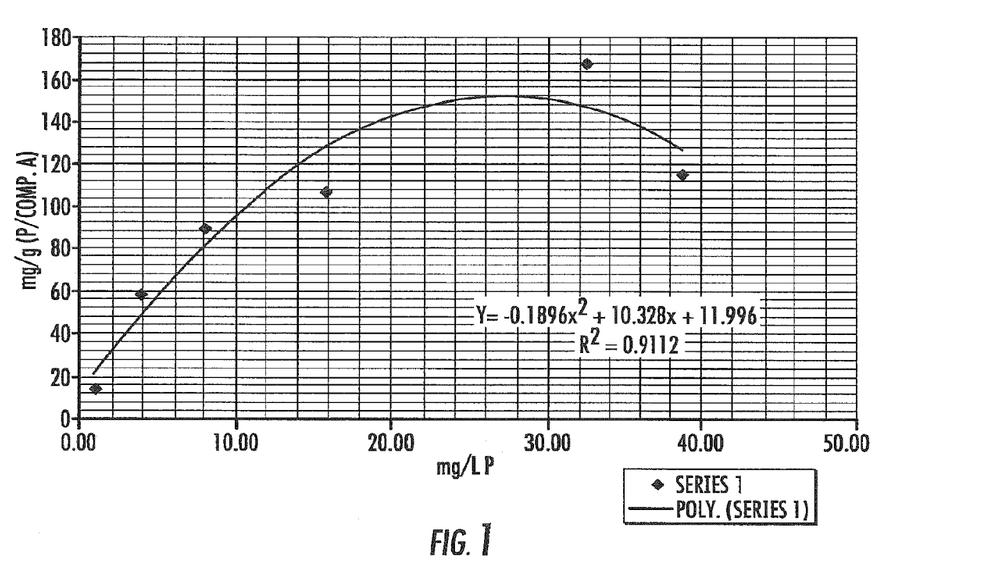
FIG. 1 is a phosphorus adsorption isotherm for a first composition (Composition A) in accordance with the invention.

FIG. 1 shows a phosphorus adsorption isotherm for the resultant composition ("Composition A").

Example 2

200 mL of a 1 M solution of sodium hydroxide was added to a mixture comprising 30 g of calcium oxide, 15 g of silicon dioxide, and 15 g of ferric chloride hexahydrate at room temperature. The resultant slurry was hydrothermally reacted in an autoclave for one to six hours under 15 psi of steam pressure. The remaining solids were heated in a muffle furnace at 600° C. for thirty minutes.

Figure 2:
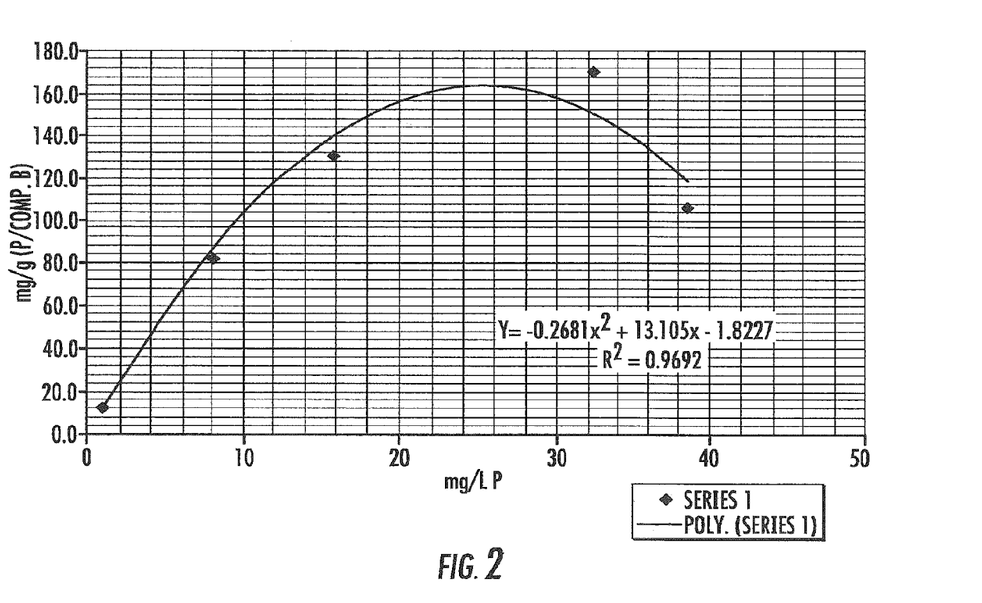
FIG. 2 is a phosphorus adsorption isotherm for a second composition (Composition B) in accordance with the invention.

FIG. 2 shows a phosphorus adsorption isotherm for the resultant composition ("Composition B").

Figure 3:
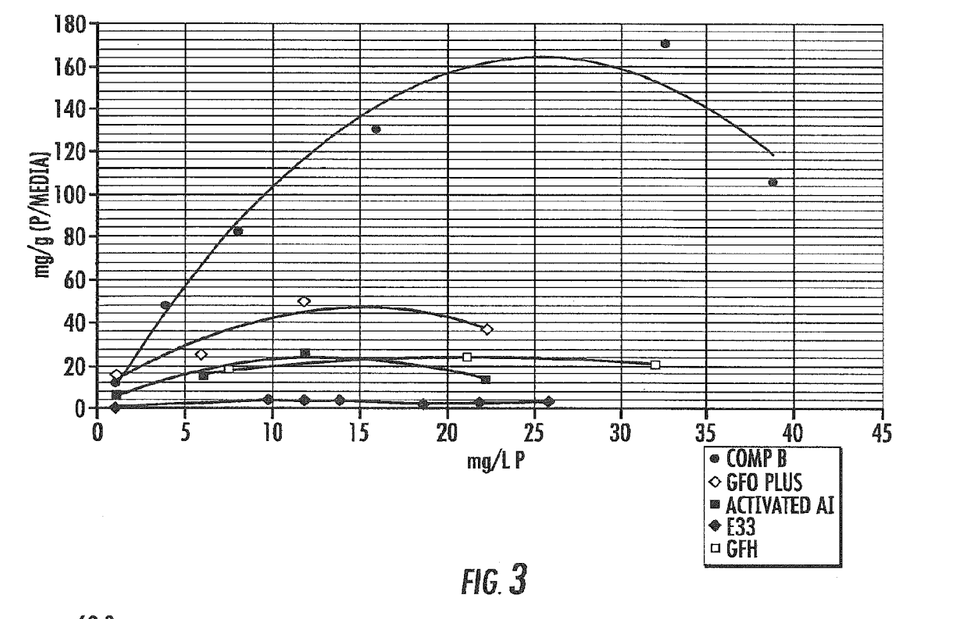
FIG. 3 is a phosphorus adsorption isotherm comparing Composition B to other phosphorus removal methods.

FIG. 3 is a phosphorus adsorption isotherm comparing Composition B to other phosphorus removal methods.

Figure 4:
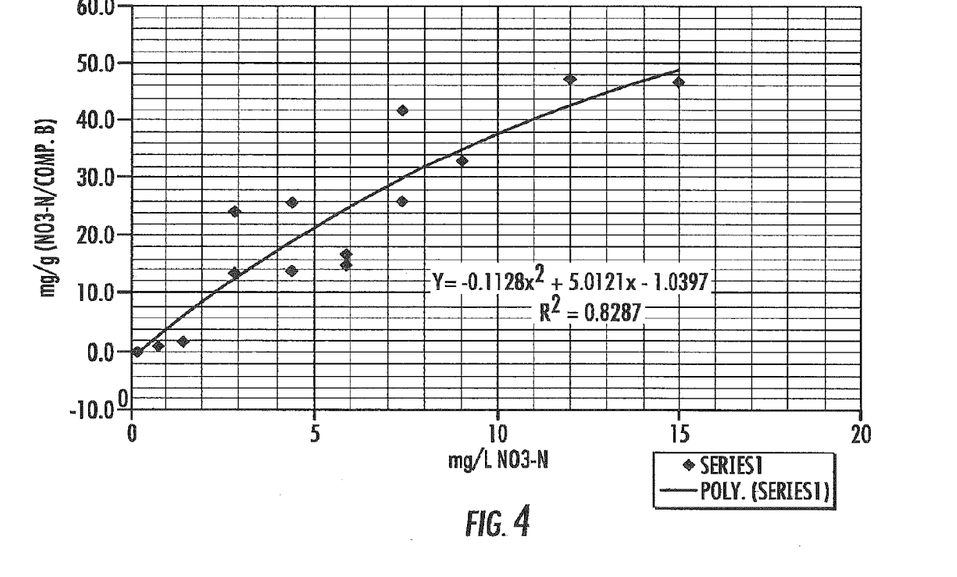
FIG. 4 is a nitrate adsorption isotherm for Composition B.

FIG. 4 is a nitrate adsorption isotherm for Composition B.

Figure 5:
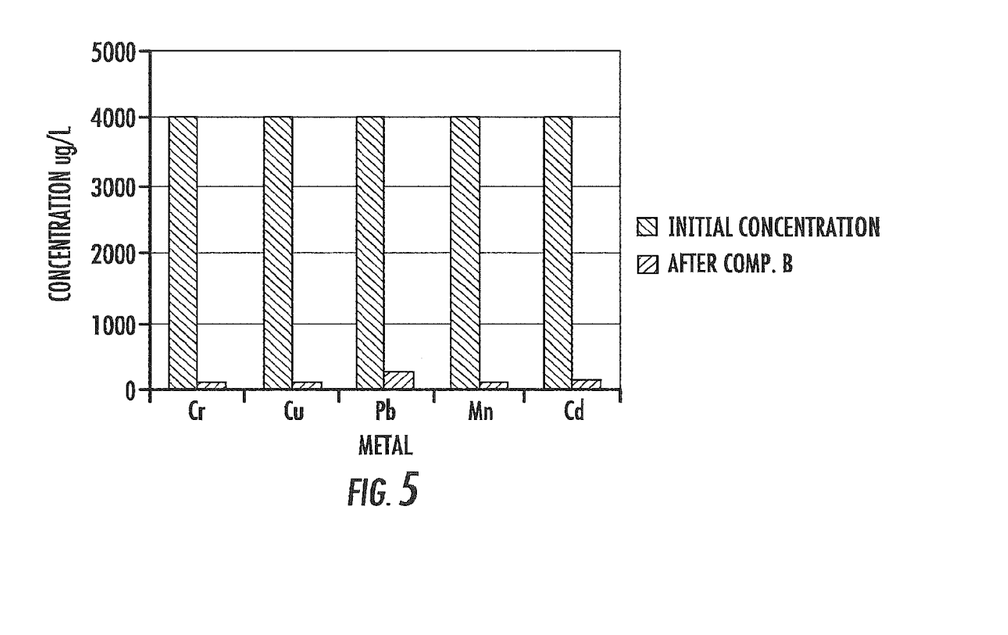
FIG. 5 demonstrates the affinity of Composition B for a variety of heavy metals.

FIG. 5 demonstrates the affinity of Composition B for a variety of heavy metals.

Figure 6:
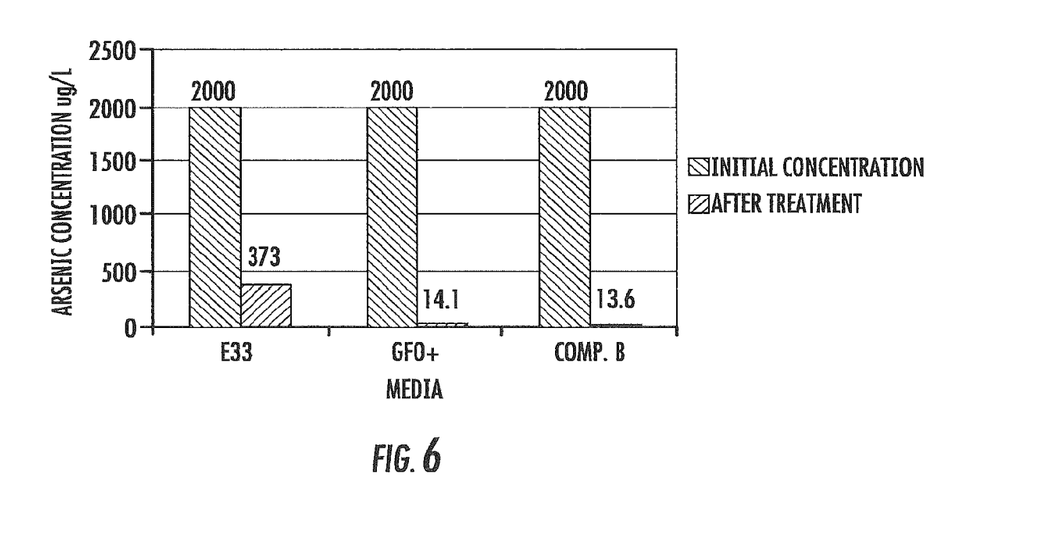
FIG. 6 demonstrates the efficiency of Composition B on the removal of arsenic from water as compared to other currently available media.

FIG. 6 demonstrates the efficiency of Composition B on the removal of arsenic from water as compared to other currently available media.

Figure 7:
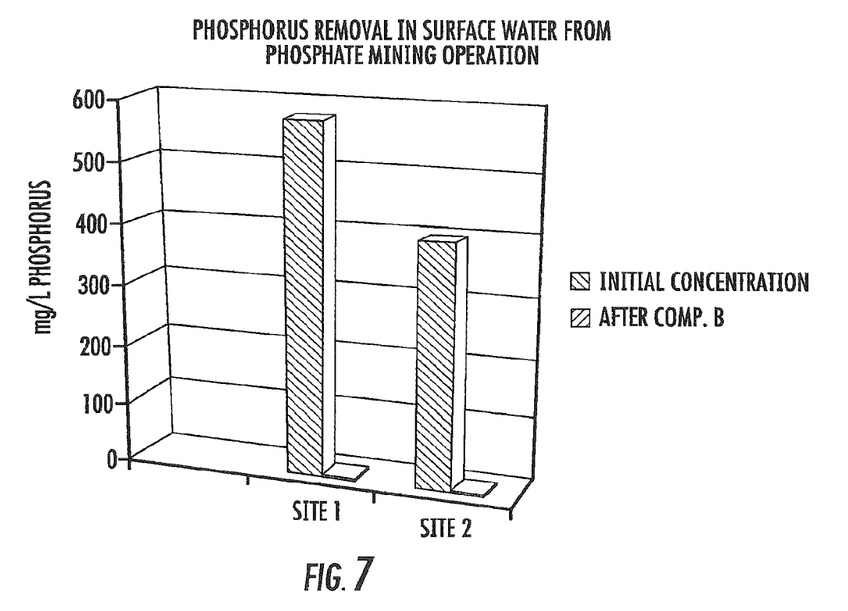
FIG. 7 is a graph showing phosphorus removal from surface water samples obtained from a phosphorus mining operation utilizing Composition B.

FIG. 7 is a graph showing phosphorus removal from surface water samples obtained from a phosphorus mining operation utilizing Composition B.

Figure 8:
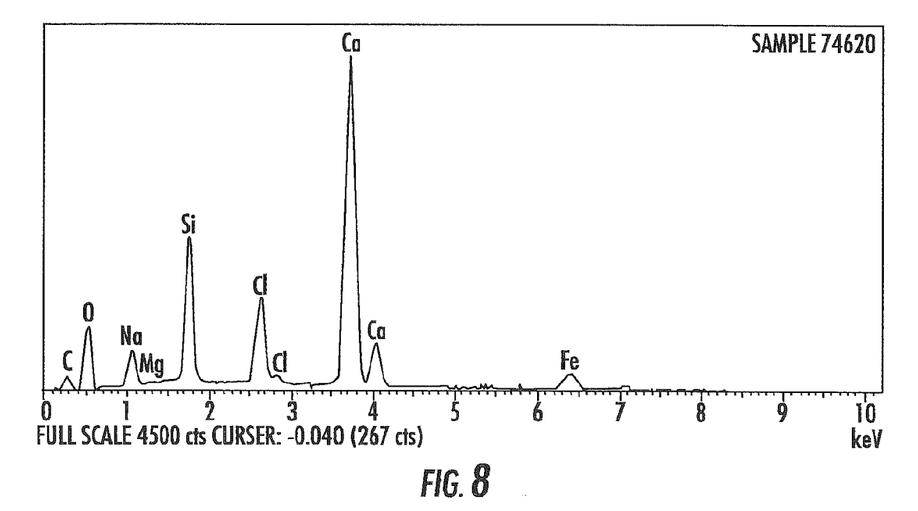
FIG. 8 is an EDS spectrum of Composition B.

FIG. 8 is an EDS graph of Composition B.

FIG. 9 shows the XRD spectrum of Composition B.

Figure 11:
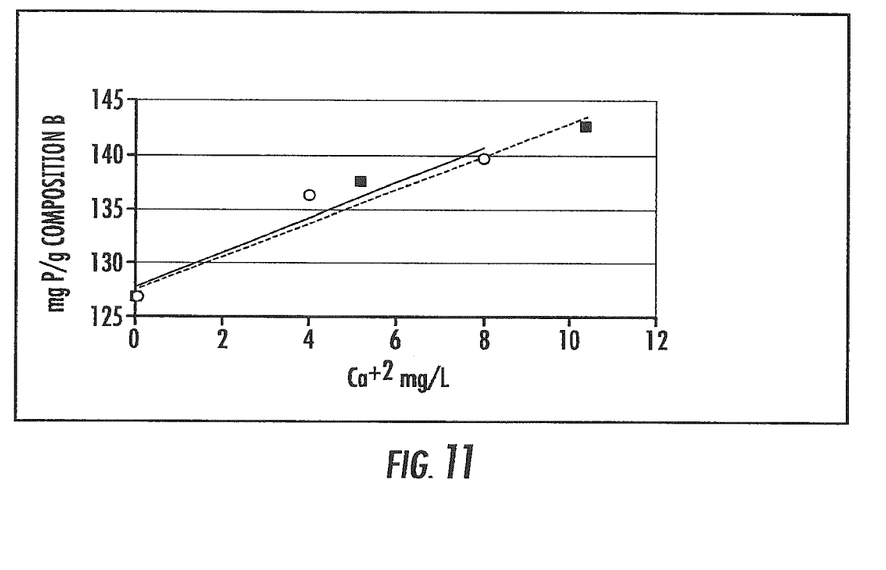
FIG. 11 shows the effect of the addition of calcium ions to Composition B's efficiency in removing phosphorus from solution.
Figure 12:
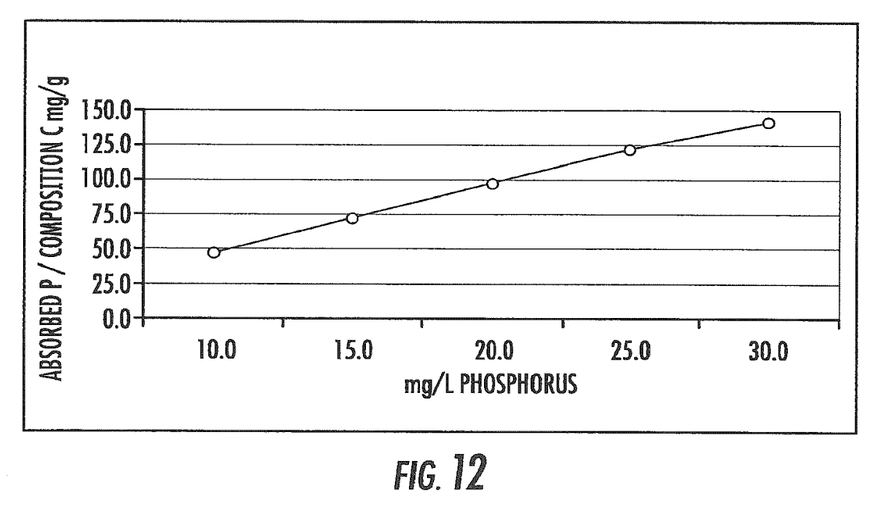
FIG. 12 is a phosphorus adsorption isotherm for a third composition (Composition C) in accordance with the invention.

FIG. 11 shows the effect of the addition of calcium ions to Composition B's efficiency in removing phosphorus from solution. ♦ shows the effect of the addition of calcium oxide. ■ shows the effect of the addition of calcium hydroxide.

Example 3

200 mL of a 1 M solution of sodium hydroxide was added to a mixture comprising 30 g of calcium oxide and 15 g of silicon dioxide at room temperature. The resultant slurry was hydrothermally reacted in an autoclave for 3 hours under 15 psi of steam pressure. The remaining solids were heated in a muffle furnace at 600° C. for 12 hours.

FIG. 11 shows a phosphorus adsorption isotherm for the resultant composition ("Composition C").

Example 4

A more in-depth investigation into the properties and uses of Compositions A, B and C was conducted. Exemplary chemical and physical properties are detailed in Table 1.

TABLE 1

| Composition | A | B | C |
| --- | --- | --- | --- |
| pH 1% solution (10 g/L) S.U. | 12.21 | 12.42 | 12.60 |
| Alkalinity 1% solution (10 g/L) mg/L as $CaCO_3$ | 1560 | 1570 | 2400 |
| Total Hardness 1% solution (10 g/L) mg/L as $CaCO_3$ | 540 | 1948 | 2340 |
| Density g/cc | 0.34 | 0.35 | 0.38 |

EDS and XRD analysis performed on Composition B indicates that the material is composed of both crystalline and amorphous structures (see FIGS. 8 and 9). The calcium silicate ($Ca_2SiO_4$) portion of the material exists as two separate crystal structures. These crystals of calcium silicate exist as two separate molecular structures. The XRD data is presented below. Relative intensity is expressed as a percentage, i.e., peak height in counts per second (cps) as a percentage of the most intense peak height. The interplanar spacing (d) and full width half maximum (FWHM) are presented as well.

TABLE 2

| Bragg angle 2Θ | d (Å) | Peak height (cps) | FWHM (deg) | Relative intensity |
| --- | --- | --- | --- | --- |
| 18.1063 | 4.89532 | 208.315 | 0.3151 | 28.67409 |
| 19.8817 | 4.46199 | 33.0368 | 0.2928 | 4.547442 |
| 20.8849 | 4.24989 | 73.0344 | 0.2043 | 10.05302 |
| 23.1636 | 3.8367 | 33.4842 | 0.4701 | 4.609025 |
| 26.6747 | 3.33912 | 464.332 | 0.1996 | 63.91426 |
| 27.4448 | 3.24714 | 64.8835 | 0.204 | 8.931069 |
| 28.7186 | 3.10595 | 70.1845 | 0.3103 | 9.66074 |
| 29.3996 | 3.03554 | 336.784 | 0.2447 | 46.35756 |
| 31.6566 | 2.82407 | 726.492 | 0.1889 | 100 |
| 34.2154 | 2.6185 | 267.297 | 0.3404 | 36.79283 |
| 36.037 | 2.49021 | 15.1368 | 0.3934 | 2.083547 |
| 39.4625 | 2.28158 | 109.214 | 0.2585 | 15.03306 |
| 41.2618 | 2.18615 | 59.116 | 0.2535 | 8.137185 |

TABLE 2-continued

| Bragg angle 2Θ | d (Å) | Peak height (cps) | FWHM (deg) | Relative intensity |
| --- | --- | --- | --- | --- |
| 43.3281 | 2.08656 | 16.46 | 0.5181 | 2.265682 |
| 45.4881 | 1.99237 | 408.821 | 0.1885 | 56.2733 |
| 47.2604 | 1.92171 | 107.694 | 0.3692 | 14.82384 |
| 47.4848 | 1.91314 | 85.011 | 0.3536 | 11.70157 |
| 48.6166 | 1.87122 | 39.2806 | 0.3704 | 5.406887 |
| 50.137 | 1.81798 | 65.8726 | 0.1421 | 9.067216 |
| 50.8006 | 1.79578 | 97.7427 | 0.3137 | 13.45406 |
| 54.3658 | 1.68613 | 49.5907 | 0.7577 | 6.826049 |
| 56.523 | 1.62679 | 118.673 | 0.2074 | 16.33507 |
| 59.9928 | 1.54073 | 43.6149 | 0.1637 | 6.003494 |
| 62.7463 | 1.47958 | 7.63492 | 0.9419 | 1.05093 |
| 64.2216 | 1.4491 | 20.5574 | 0.5663 | 2.82968 |
| 66.2656 | 1.40927 | 47.7325 | 0.2037 | 6.570272 |
| 68.2524 | 1.37301 | 34.818 | 0.348 | 4.79262 |
| 75.3313 | 1.26058 | 95.0097 | 0.2118 | 13.07787 |
| 81.4414 | 1.18074 | 12.4564 | 0.545 | 1.714596 |
| 84.0006 | 1.15116 | 67.5945 | 0.2521 | 9.304232 |
| 84.7205 | 1.14321 | 25.5075 | 0.3976 | 3.51105 |
| 107.4102 | 0.95571 | 6.85162 | 0.8705 | 0.94311 |
| 110.036 | 0.94013 | 30.6148 | 0.2791 | 4.214059 |

Both Composition A and Composition B were evaluated for their ability and efficiency in adsorbing ortho-phosphate ion ($PO_4^{-2}$). Adsorption isotherms were prepared with data obtained from laboratory experiments (see FIGS. 1 and 2). Both materials exhibited excellent phosphate removal efficiency with adsorption ratios around 160-170 mg/g (i.e., mg P per g of Composition A and B). Phosphate adsorption comparisons showing Composition B versus various other typical adsorbents are detailed in FIG. 3. Kinetic rates for the phosphate adsorption reaction are very fast—in the order of minutes for most situations. The phosphorus removal achieved on the phosphate mining operation surface water was achieved after one hour (see FIG. 7). This particular sample showed adsorption efficiency approaching 280 mg/g.

The optimal pH range for most efficient adsorption is 9.0-12.5 S.U. and, in most applications, this pH range is achieved by addition of the composition. The additional calcium provided by the calcium hydroxide $Ca(OH)_2$ offsets the potentially adverse effect of calcium carbonate $CaCO_3$ formation at higher pH.

It is believed that the presence of ferric chloride hexahydrate ($FeCl_3.6H_2O$) in the slurry of Composition B provides compositions in accordance with the present invention good efficiency for nitrate ($NO_3^-$) adsorption. Adsorption isotherms were prepared with data obtained from laboratory experiments (see FIG. 4). Adsorption ratios of around 50 mg/g (i.e., mg N per g Composition B) were attained. The optimal pH for the most efficient adsorption of nitrate is around 6.0 S.U. Due to the high alkalinity of Composition B, pH adjustment over the reaction period is required.

Composition B demonstrates the ability to adsorb heavy metal ions. Removal efficiencies of 93-98% were achieved for chromium (Cr), copper (Cu), lead (Pb), manganese (Mn), and cadmium (Cd) (see FIG. 5). Specific removal efficiencies are set forth in Table 2.

TABLE 3

| Metal | Initial Concentration µg/L | Concentration After Application of Composition B µg/L | % Removal |
| --- | --- | --- | --- |
| Cr | 4000 | 74 | 98.15 |
| Cu | 4000 | 80 | 98.00 |
| Pb | 4000 | 259 | 93.53 |

TABLE 3-continued

| Metal | Initial Concentration μg/L | Concentration After Application of Composition B μg/L | % Removal |
|---|---|---|---|
| Mn | 4000 | 89 | 97.78 |
| Cd | 4000 | 114 | 97.15 |

Composition B was also evaluated for its ability to adsorb arsenic (As). Composition B was compared against the commonly used media GFO plus and E33. The comparisons were made using standard downflow packed column tests (see FIG. 6). Removal efficiencies are set forth in Table 3. The optimal pH range for most efficient adsorption is 9.0-12.5 S.U.

TABLE 4

| Media | Initial Concentration μg/L | Concentration After Treatment μg/L | % Removal |
|---|---|---|---|
| E33 | 2000 | 373 | 81.35 |
| GFO+ | 2000 | 14.1 | 99.30 |
| Composition B | 2000 | 13.6 | 99.32 |

Example 5

Adsorbed Phosphate and Nitrate Recovery for Fertilizer Use

Crystals that have adsorbed both phosphate and nitrate are easily removed from an aqueous solution via filtration or gravity settling. Drying these crystals may be accomplished by either oven drying or simple air drying. Based on laboratory isotherms the fertilizer value of saturated crystals derived from Composition B is 5-35-0, which represents 5% nitrogen (N), 35% phosphorus as $P_2O_5$, and 0% potassium (K). In some instances, the fertilizer value may increase as the treatment of surface water from a phosphate mining operation demonstrates (57% phosphorus as $P_2O_5$). See, e.g., FIG. 11.

What is claimed is:

1. A composition characterized by an EDS spectrum shown in FIG. 8.

2. A composition characterized by an XRD spectrum shown in FIG. 9.

3. A composition comprising calcium silicate, calcium hydroxide, sodium chloride, silicon dioxide and calcium carbonate crystal structures characterized by an X-ray diffraction pattern expressed in terms of Bragg angle 2Θ, interplanar spacing, and relative intensity values:

| Bragg angle 2Θ | d | Relative intensity |
|---|---|---|
| 18.1063 | 4.89532 | 28.67409 |
| 19.8817 | 4.46199 | 4.547442 |
| 20.8849 | 4.24989 | 10.05302 |
| 23.1636 | 3.8367 | 4.609025 |
| 26.6747 | 3.33912 | 63.91426 |
| 27.4448 | 3.24714 | 8.931069 |
| 28.7186 | 3.10595 | 9.66074 |
| 29.3996 | 3.03554 | 46.35756 |
| 31.6566 | 2.82407 | 100 |
| 34.2154 | 2.6185 | 36.79283 |
| 36.037 | 2.49021 | 2.083547 |
| 39.4625 | 2.28158 | 15.03306 |
| 41.2618 | 2.18615 | 8.137185 |
| 43.3281 | 2.08656 | 2.265682 |
| 45.4881 | 1.99237 | 56.2733 |
| 47.2604 | 1.92171 | 14.82384 |
| 47.4848 | 1.91314 | 11.70157 |
| 48.6166 | 1.87122 | 5.406887 |
| 50.137 | 1.81798 | 9.067216 |
| 50.8006 | 1.79578 | 13.45406 |
| 54.3658 | 1.68613 | 6.826049 |
| 56.523 | 1.62679 | 16.33507 |
| 59.9928 | 1.54073 | 6.003494 |
| 62.7463 | 1.47958 | 1.05093 |
| 64.2216 | 1.4491 | 2.82968 |
| 66.2656 | 1.40927 | 6.570272 |
| 68.2524 | 1.37301 | 4.79262 |
| 75.3313 | 1.26058 | 13.07787 |
| 81.4414 | 1.18074 | 1.714596 |
| 84.0006 | 1.15116 | 9.304232 |
| 84.7205 | 1.14321 | 3.51105 |
| 107.4102 | 0.95571 | 0.94311 |
| 110.036 | 0.94013 | 4.214059. |

* * * * *

UNITED STATES PATENT AND TRADEMARK OFFICE
CERTIFICATE OF CORRECTION

PATENT NO.          : 9,434,624 B2                              Page 1 of 1
APPLICATION NO.     : 14/630876
DATED               : September 6, 2016
INVENTOR(S)         : Steven A. Odom and Denny J. Ivey It is certified that error appears in the above-identified patent and that said Letters Patent is hereby corrected as shown below:

On the Title Page

Item (73), the Assignee name was misspelled and the city, state has been changed. Please change the Assignee information as follows:
Assignee: NClear Inc., Atlanta, GA (US)

Signed and Sealed this
Twenty-eighth Day of August, 2018

Andrei Iancu
*Director of the United States Patent and Trademark Office*